United States Patent
Inoue

(10) Patent No.: US 11,008,443 B2
(45) Date of Patent: May 18, 2021

(54) LATEX AND FRICTION MATERIAL

(71) Applicant: ZEON CORPORATION, Tokyo (JP)

(72) Inventor: Sayaka Inoue, Chiyoda-ku (JP)

(73) Assignee: ZEON CORPORATION, Tokyo (JP)

( * ) Notice: Subject to any disclaimer, the term of this patent is extended or adjusted under 35 U.S.C. 154(b) by 90 days.

(21) Appl. No.: 16/085,698

(22) PCT Filed: Mar. 16, 2017

(86) PCT No.: PCT/JP2017/010737
§ 371 (c)(1),
(2) Date: Sep. 17, 2018

(87) PCT Pub. No.: WO2017/164076
PCT Pub. Date: Sep. 28, 2017

(65) Prior Publication Data
US 2019/0144642 A1 May 16, 2019

(30) Foreign Application Priority Data
Mar. 23, 2016 (JP) .............................. JP2016-058343

(51) Int. Cl.
*C08L 9/04* (2006.01)
*F16D 69/02* (2006.01)
*F16D 13/62* (2006.01)
*C08K 3/08* (2006.01)
*C09K 3/14* (2006.01)
*C08L 61/06* (2006.01)

(52) U.S. Cl.
CPC .................. *C08L 9/04* (2013.01); *C08K 3/08* (2013.01); *C08L 61/06* (2013.01); *C09K 3/14* (2013.01); *F16D 13/62* (2013.01); *F16D 69/02* (2013.01); *F16D 69/025* (2013.01); *C08K 2003/0818* (2013.01); *C08K 2003/0825* (2013.01); *C08K 2201/014* (2013.01); *C08L 2201/08* (2013.01); *F16D 2200/0056* (2013.01); *F16D 2200/0082* (2013.01)

(58) Field of Classification Search
None
See application file for complete search history.

(56) References Cited

U.S. PATENT DOCUMENTS

| | | | |
|---|---|---|---|
| 4,593,070 A | 6/1986 | Oyama et al. | |
| 5,556,919 A | 9/1996 | Oyama et al. | |
| 2014/0065336 A1 | 3/2014 | Nakashima et al. | |
| 2017/0355854 A1 | 12/2017 | Inoue et al. | |
| 2018/0022951 A1* | 1/2018 | Kondo | ..................... H01B 1/22 252/514 |

FOREIGN PATENT DOCUMENTS

| | | |
|---|---|---|
| CN | 103443188 A | 12/2013 |
| EP | 3239265 A1 | 11/2017 |
| JP | S60-184533 A | 9/1985 |
| JP | S61-218636 A | 9/1986 |
| JP | H08-100082 A | 4/1996 |
| JP | 2010-100749 A | 5/2010 |
| JP | 2010-144081 A | 7/2010 |

OTHER PUBLICATIONS

Oct. 16, 2019 Search Report issued in European Patent Application No. 17770118.2.
Feb. 3, 2020 Office Action issued in Russian Patent Application No. 2018132883/05(053853).
Jun. 20, 2017 International Search Report issued in International Patent Application No. PCT/JP2017/010737.
Jun. 30, 2020 Office Action issued in Indian Patent Application No. 201817038294.
Feb. 11, 2021 Office Action issued in Indian Patent Application No. 201817038294.

* cited by examiner

*Primary Examiner* — Megan McCulley
(74) *Attorney, Agent, or Firm* — Oliff PLC

(57) ABSTRACT

A latex of a carboxyl group-containing nitrile rubber contains an α,β-ethylenically unsaturated nitrile monomer unit in a content of 8 to 60 wt % and having an iodine value of 120 or less, wherein the total content of potassium and sodium contained in the latex is 2,300 to 10,000 ppm by weight with respect to the whole latex.

6 Claims, No Drawings

LATEX AND FRICTION MATERIAL

TECHNICAL FIELD

The present invention relates to a latex excellent in chemical stability and thermal stability, and additionally, excellent in heat resistance and friction properties, and a friction material obtained by using the aforementioned latex.

BACKGROUND ART

Latexes of nitrile rubbers containing nitrile monomer units have hitherto been used in a wide variety of applications. For example, such latexes have been used in a wide variety of fields: raw materials of nonwoven fabrics widely used as clothing, industrial materials such as filters and heat insulators, hygienic goods such as masks and white coats, automobile interior materials and air conditioning filters, and the like; compositions for dip forming of nipple, glove, and the like; adhesives between the woven fabrics base-material and rubber members of toothed belts and other various belts for automobiles and industries; adhesives for rubber-reinforcing fibers such as tire cords; fiber processing agent; various binders such as battery binders and paper coating binders; papermaking; paper coating compositions; compositions for modifying resins; foam rubbers; various sealing materials; coating materials; friction materials and the like.

In a wide variety of such applications as described above, latexes of nitrile rubbers have been demanded to have chemical stability and thermal stability as the storage and preservation stabilities higher than conventional ones in the storage after production and the preservation after shipment subsequent to filling in various containers. In addition, due to further miniaturization of members, components, instruments and the like where latexes of nitrile rubbers are used, latexes of nitrile rubbers have been demanded to have heat resistance higher than conventional ones.

Moreover, in the above-mentioned applications, friction materials such as brake lining, disc pad, and clutch facing for automobiles and industrial machines have hitherto used asbestos as the base materials, but there has been demanded in a development of non-asbestos-based friction materials from a viewpoint of the problem of asbestos pollution. At present, there have been developed and used friction materials using fiber base materials such as glass fiber, carbon fiber, aramid fiber, rock wool, ceramic fiber, and various steel fibers as substitute materials for asbestos. The friction materials using such fiber base materials are usually produced by making resin compositions containing thermosetting resins, rubber components and the like attached to or mixing with fiber base materials in order to improve the friction properties and the like.

For example, Patent Document 1 discloses a method for producing a clutch facing wherein a thermosetting resin composition prepared by mixing a rubber component with a thermosetting resin such as a phenolic resin, a urea resin, a melamine resin, or an epoxy resin is attached to the base material fibers, then a binder composition containing a rubber agent is further attached to the base material fibers, and subsequently, the base material fibers are preliminarily famed into a spiral or laminate form, and then the resulting preliminarily famed product is heated and compressed.

However, the clutch facing obtained by the technique of Patent Document 1 is not sufficient in heat resistance (for example, the change amount in friction properties after thermal aging is large), and consequently there has been desired an improvement of the heat resistance.

RELATED ART

Patent Documents

Patent Document 1: Japanese Patent Laid-Open No. 61-218636

SUMMARY OF THE INVENTION

Problem to be Solved by the Invention

An object of the present invention is to provide a latex excellent in chemical stability and thermal stability, and additionally, excellent in heat resistance and friction properties. Moreover, another object of the present invention is to provide a friction material obtained by using the aforementioned latex.

Means for Solving the Problem

The present inventor engaged in a diligent study to solve the above-mentioned problem to be solved, and consequently have perfected the present invention by discovering that the above objects can be achieved by controlling the total content of the potassium and sodium contained in a latex so as to fall within a predetermined range, in the latex of a carboxyl group-containing nitrile rubber containing an $\alpha,\beta$-ethylenically unsaturated nitrile monomer unit in a content of 8 to 60 wt %, and having an iodine value of 120 or less.

That is, the present invention provides a latex of a carboxyl group-containing nitrile rubber containing an $\alpha,\beta$-ethylenically unsaturated nitrile monomer unit in a content of 8 to 60 wt %, and having an iodine value of 120 or less, wherein the total content of potassium and sodium contained in the latex is 2,300 to 10,000 ppm by weight with respect to the whole latex.

In the latex of the present invention, the total content of potassium and sodium is preferably 4,500 to 33,000 ppm by weight with respect to the carboxyl group-containing nitrile rubber.

In the latex of the present invention, the pH is preferably less than 12.

In addition, the present invention provides a latex composition comprising the above-mentioned latex and a thermosetting resin.

In the latex composition of the present invention, the thermosetting resin is preferably a phenolic resin.

Moreover, the present invention provides a friction material prepared by making the above-mentioned latex composition attached to or mixed with a base material.

Effects of Invention

The present invention can provide a latex excellent in chemical stability and thermal stability, and additionally excellent in heat resistance and friction properties, and a friction material obtained by using the aforementioned latex.

DESCRIPTION OF EMBODIMENTS

Latex

The latex of the present invention contains a carboxyl group-containing nitrile rubber containing an $\alpha,\beta$-ethylenically unsaturated nitrile monomer unit in a content of 8 to 60 wt %, and having an iodine value of 120 or less, wherein the total content of potassium and sodium contained in the latex is 2,300 to 10,000 ppm by weight with respect to the whole latex.

According to the present invention, in the latex containing the carboxyl group-containing nitrile rubber having the above-mentioned constitution, by regulating the total content of the potassium and sodium contained in the latex so as to fall within the specific range, the chemical stability and the thermal stability of the latex itself can be improved, and moreover the latex can be made excellent in compatibility (miscibility) with a thermosetting resin, and accordingly, when a friction material is obtained by mixing a thermosetting resin and a base material with the aforementioned latex, the obtained friction material can be made excellent in heat resistance and friction properties.

Hereinafter, first, the carboxyl group-containing nitrile rubber constituting the latex of the present invention will be explained. The carboxyl group-containing nitrile rubber constituting the latex of the present invention is a nitrile rubber containing a carboxyl group which contains an $\alpha,\beta$-ethylenically unsaturated nitrile monomer unit in a content of 8 to 60 wt %, and has an iodine value of 120 or less.

The carboxyl group-containing nitrile rubber constituting the latex of the present invention can be obtained, for example, by copolymerizing an $\alpha,\beta$-ethylenically unsaturated nitrile monomer, a carboxyl group-containing monomer, and a monomer being copolymerizable with these and used if necessary.

The $\alpha,\beta$-ethylenically unsaturated nitrile monomer is, without being particularly limited to, an $\alpha,\beta$-ethylenically unsaturated nitrile monomer having preferably 3 to 18 carbon atoms, and particularly preferably 3 to 9 carbon atoms. As specific examples of such a monomer, acrylonitrile, methacrylonitrile, $\alpha$-chloroacrylonitrile, and the like may be mentioned; among these, acrylonitrile is preferable. These $\alpha,\beta$-ethylenically unsaturated nitrile monomers may be used as single types alone or as two or more types combined.

The content of the $\alpha,\beta$-ethylenically unsaturated nitrile monomer unit in the carboxyl group-containing nitrile rubber is 8 to 60 wt %, preferably 10 to 60 wt %, more preferably 12 to 58 wt %, and still more preferably 16 to 50 wt %. When the content of the $\alpha,\beta$-ethylenically unsaturated nitrile monomer unit is too small, the compatibility (miscibility) of the carboxyl group-containing nitrile rubber is degraded when the carboxyl group-containing nitrile rubber is mixed with a thermosetting resin, and consequently the heat resistance of the obtained friction material is decreased. On the other hand, when the content of the $\alpha,\beta$-ethylenically unsaturated nitrile monomer unit is too large, the elasticity and the cold resistance of the obtained friction material are decreased.

The carboxyl group-containing monomer is not particularly limited so long as the monomer being copolymerizable with the $\alpha,\beta$-ethylenically unsaturated nitrile monomer and having one or more unsubstituted carboxyl groups (free carboxyl groups) that is not esterified or the like. By using a carboxyl group-containing monomer, a carboxyl group can be introduced into the nitrile rubber.

As the carboxyl group-containing monomer used in the present invention, an $\alpha,\beta$-ethylenically unsaturated monocarboxylic acid monomer, an $\alpha,\beta$-ethylenically unsaturated polyvalent carboxylic acid monomer, an $\alpha,\beta$-ethylenically unsaturated dicarboxylic acid monoester monomer, and the like may be mentioned. The carboxyl group-containing monomer also include the monomer in which the carboxyl group of these monomer form a carboxylic acid salt. Moreover, the anhydride of the $\alpha,\beta$-ethylenically unsaturated polyvalent carboxylic acid forms a carboxyl group by cleaving the acid anhydride group after copolymerization, and hence can be used as a carboxyl group-containing monomer.

As the $\alpha,\beta$-ethylenically unsaturated monocarboxylic acid monomer, acrylic acid, methacrylic acid, ethylacrylic acid, crotonic acid, cinnamic acid, and the like may be mentioned.

As the $\alpha,\beta$-ethylenically unsaturated polyvalent carboxylic acid monomer, a butenedioic acid such as fumaric acid and maleic acid; and itaconic acid, citraconic acid, mesaconic acid, glutaconic acid, allylmalonic acid, teraconic acid, and the like may be mentioned. As the anhydride of the $\alpha,\beta$-unsaturated polyvalent carboxylic acid, maleic anhydride, itaconic anhydride, citraconic anhydride, and the like may be mentioned.

As the $\alpha,\beta$-ethylenically unsaturated dicarboxylic acid monoester monomer, a maleic acid monoalkyl ester such as monomethyl maleate, monoethyl maleate, monopropyl maleate, and mono-n-butyl maleate; a maleic acid monocycloalkyl ester such as monocyclopentyl maleate, monocyclohexyl maleate, and monocycloheptyl maleate; a maleic acid monoalkyl cycloalkyl ester such as monomethyl cyclopentyl maleate and monoethyl cyclohexyl maleate; a fumaric acid monoalkyl ester such as monomethyl fumarate, monoethyl fumarate, monopropyl fumarate, and mono-n-butyl fumarate; a fumaric acid monocycloalkyl ester such as monocyclopentyl fumarate, and monocyclohexyl fumarate, and monocycloheptyl fumarate; a fumaric acid monoalkyl cycloalkyl ester such as monomethyl cyclopentyl fumarate and monoethyl cyclohexyl fumarate; a citraconic acid monoalkyl ester such as monomethyl citraconate, monoethyl citraconate, monopropyl citraconate, and mono-n-butyl citraconate; a citraconic acid monocycloalkyl ester such as monocyclopentyl citraconate, monocyclohexyl citraconate, and monocycloheptyl citraconate; a citraconic acid monoalkyl cycloalkyl ester such as monomethyl cyclopentyl citraconate and monoethyl cyclohexyl citraconate; an itaconic acid monoalkyl ester such as monomethyl itaconate, monoethyl itaconate, monopropyl itaconate, and mono-n-butyl itaconate; an itaconic acid monocycloalkyl ester such as monocyclopentyl itaconate, monocyclohexyl itaconate, and monocycloheptyl itaconate; an itaconic acid monoalkyl cycloalkyl ester such as monomethyl cyclopentyl itaconate, and monoethyl cyclohexyl itaconate; and the like may be mentioned.

The carboxyl group-containing monomers may be used as single types alone or as a plurality of types combined. Among the carboxyl group-containing monomers, from the viewpoint of being able to make the effect of the present invention much more remarkable, the $\alpha,\beta$-ethylenically unsaturated monocarboxylic acid monomer is preferable, acrylic acid or methacrylic acid is preferable, and methacrylic acid is more preferable.

The content of the carboxyl group-containing monomer unit in the carboxyl group-containing nitrile rubber is preferably 0.1 to 20 wt %, more preferably 0.5 to 15 wt %, and still more preferably 1 to 10 wt %. By setting the content of the carboxyl group-containing monomer unit within the above-mentioned range, it is possible to make the compatibility (miscibility) with a thermosetting resin and the adhesiveness to the base material good. On the other hand, when the carboxyl group-containing monomer unit is not contained, the adhesiveness to the base material and the bending fatigue resistance are made poor.

In addition, the carboxyl group-containing nitrile rubber constituting the latex of the present invention is preferably a rubber prepared by copolymerizing an α,β-ethylenically unsaturated nitrile monomer, a carboxyl group-containing monomer, and a conjugated diene monomer, from the viewpoint of developing rubber elasticity.

As the conjugated diene monomer, a conjugated diene monomer having 4 to 6 carbon atoms such as 1,3-butadiene, isoprene, 2,3-dimethyl-1,3-butadiene, 1,3-pentadiene, and chloroprene is preferable, 1,3-butadiene and isoprene are more preferable, and 1,3-butadiuene is particularly preferable. The conjugated diene monomers may be used as single types alone or as a plurality of types combined.

The content of the conjugated diene monomer unit in the carboxyl group-containing nitrile rubber is preferably 20 to 90 wt %, more preferably 35 to 85 wt %, and still more preferably 50 to 80 wt %. By setting the content of the conjugated diene monomer unit within the above-mentioned range, it is possible to appropriately improve the rubber elasticity while the heat resistance and chemical stability are being made good. Note that the above-mentioned content of the conjugated diene monomer unit is the content including the hydrogenated part when the below-mentioned hydrogenation is performed.

In addition, the carboxyl group-containing nitrile rubber constituting the latex of the present invention may be a rubber prepared by copolymerizing an α,β-ethylenically unsaturated nitrile monomer, a carboxyl group-containing monomer, and a conjugated diene monomer, and another monomer copolymerizable with these. As such another monomer, ethylene, an α-olefin monomer, an aromatic vinyl monomer, an α,β-ethylenically unsaturated carboxylic acid ester monomer (exclusive of those corresponding to the above-mentioned "carboxyl group-containing monomer"), a fluorine-containing vinyl monomer, and a copolymerizable antiaging agent, and the like may be mentioned.

As the α-olefin monomer, an α-olefin monomer having 3 to 12 carbon atoms are preferable; for example, propylene, 1-butene, 4-methyl-1-pentene, 1-hexene, and 1-octene, and the like may be mentioned.

As the aromatic vinyl monomer, for example, styrene, α-methylstyrene, and vinylpyridine, and the like may be mentioned.

As the α,β-ethylenically unsaturated carboxylic acid ester monomer, for example, a (meth)acrylic acid ester (abbreviations for "methacrylic acid ester and acrylic acid ester," and the same shall apply hereinafter) having an alkyl group having 1 to 18 carbon atoms such as methyl acrylate, ethyl acrylate, n-butyl acrylate, n-dodecyl acrylate, methyl methacrylate, and ethyl methacrylate; a (meth)acrylic acid ester having an alkoxy alkyl group having 2 to 12 carbon atoms such as methoxymethyl acrylate, methoxyethyl acrylate, and methoxyethyl methacrylate; a (meth)acrylic acid ester having a cyanoalkyl group having 2 to 12 carbon atoms such as α-cyanoethyl acrylate, α-cyanoethyl methacrylate, and α-cyanobutyl methacrylate; a (meth)acrylic acid ester having a hydroxyalkyl group having 1 to 12 carbon atoms such as 2-hydroxyethyl acrylate, 2-hydroxypropyl acrylate, and 2-hydroxyethyl methacrylate; a (meth)acrylic acid ester having a fluoroalkyl group having 1 to 12 carbon atoms such as trifluoroethyl acrylate, and tetrafluoropropyl methacrylate; an α,β-ethylenically unsaturated dicarboxylic acid dialkyl ester such as dimethyl maleate, dimethyl fumarate, dimethyl itaconate, and diethyl itaconate; a dialkylamino group-containing α,β-ethylenically unsaturated carboxylic acid ester such as dimethylaminomethyl acrylate, and diethylaminoethyl acrylate; and the like may be mentioned.

As the fluorine-containing vinyl monomer, for example, fluoroethyl vinyl ether, fluoropropyl vinyl ether, o-trifluoromethyl styrene, vinyl pentafluorobenzoate, difluoroethylene, tetrafluoroethylene, and the like may be mentioned.

As the copolymerizable antiaging agent, for example, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy) aniline, N-phenyl-4-(4-vinylbenzyloxy)aniline, and the like may be mentioned.

These copolymerizable other monomers may be used as a plurality of types combined. The content of the copolymerizable other monomer unit is preferably 50 wt % or less, more preferably 30 wt % or less, and still more preferably 10 wt % or less, with respect to all the monomer units.

The iodine value of the carboxyl group-containing nitrile rubber constituting the latex of the present invention is 120 or less, preferably 60 or less, more preferably 45 or less, and still more preferably 38 or less. When the iodine value is too large, the effect due to the regulation of the total content of the potassium and sodium contained in the latex within the above-mentioned specific range, in particular, the improvement effect of the heat resistance of the latex itself is not obtained.

The polymer Mooney viscosity (ML1+4, 100° C.) of the carboxyl group-containing nitrile rubber constituting the latex of the present invention is preferably 10 to 200, more preferably 15 to 150, still more preferably 20 to 140, and particularly preferably 30 to 130. By setting the polymer Mooney viscosity within the above-mentioned range, it is possible to improve the processability while the mechanical properties are maintained good.

In addition, the content of the carboxyl group in the carboxyl group-containing nitrile rubber constituting the latex of the present invention, that is, the number of moles of the carboxyl group per 100 g of the carboxyl group-containing nitrile rubber is preferably $5 \times 10^{-4}$ to $5 \times 10^{-1}$ ephr, more preferably $1 \times 10^{-3}$ to $1 \times 10^{-1}$ ephr, and particularly preferably $5 \times 10^{-3}$ to $8 \times 10^{-2}$ ephr. By setting the content of the carboxyl group of the carboxyl group-containing nitrile rubber within the above-mentioned range, it is possible to improve the adhesiveness to the base material.

In addition, the pH of the latex of the present invention is preferably less than 12, more preferably within a range from 7.0 to 11.5, still more preferably within a range from 7.5 to 11.0, and particularly preferably within a range from 7.5 to 10.0. By setting the pH within the above-mentioned range, it is possible to make higher the compatibility (miscibility) with a thermosetting resin, and consequently, it is possible to make the friction material to be obtained more excellent in heat resistance and friction properties.

The method for producing the latex of the present invention is not particularly limited, but the latex of the present invention is obtained by copolymerizing the above-mentioned monomers and, if necessary, hydrogenating the carbon-carbon double bonds in the obtained copolymer. The polymerization method is not particularly limited and a known emulsion polymerization method or solution polymerization method may be used, but the emulsion polymerization method is preferable from the viewpoint of the industrial productivity. At the time of the emulsion polymerization, in addition to the emulsifier, a polymerization initiator, and a molecular weight adjuster, polymerization auxiliary materials which are usually used can be used.

The emulsifier is not particularly limited, but, for example, a nonionic emulsifier such as polyoxyethylene alkyl ether, polyoxyethylene alkyl phenol ether, polyoxyethylene alkyl ester, and polyoxyethylene sorbitan alkyl ester; an anionic emulsifier such as salt of fatty acid such as myristic acid, palmitic acid, oleic acid, and linoleic acid, alkylbenzene sulfonic acid salt such as sodium dodecylbenzenesulfonate, higher alcohol sulfuric acid ester salt, and alkyl sulfosuccinic acid salt; and a copolymerizable emulsifier such as sulfo ester of α,β-unsaturated carboxylic acid, sulfate ester of α,β-unsaturated carboxylic acid, sulfoalkylaryl ether; and the like may be mentioned. The amount of addition of the emulsifier is preferably 0.1 to 10 parts by weight and more preferably 0.5 to 5 parts by weight with respect to 100 parts by weight of the monomer used for the polymerization.

The polymerization initiator is not particularly limited so long as the polymerization initiator is a radical initiator. As the polymerization initiator, an inorganic peroxide such as potassium persulfate, sodium persulfate, ammonium persulfate, potassium peiphosphate, and hydrogen peroxide; an organic peroxide such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxyisobutyrate; an azo compound such as azobisisobutyronitrile, azobis-2,4-dimethylvaleronitrile, azobiscyclohexanecarbonitrile, and methyl azobisisobutyrate; and the like may be mentioned. These polymerization initiators can be used alone or as two or more types combined. As the polymerization initiator, an inorganic or organic peroxide is preferable. When a peroxide is used as a polymerization initiator, the peroxide can be used in combination with a reducing agent such as sodium bisulfite and ferrous sulfate as a redox-type polymerization initiator. The amount of addition of the polymerization initiator is preferably 0.01 to 2 parts by weight, with respect to 100 parts by weight of the monomers used for the polymerization.

The molecular weight adjuster is not particularly limited, but as the molecular weight adjuster, a mercaptan such as t-dodecyl mercaptan, n-dodecyl mercaptan, octyl mercaptan, and nonyl mercaptan; a halogenated hydrocarbon such as carbon tetrachloride, methylene chloride, and methylene bromide; α-methylstyrene dimer; a sulfur-containing compound such as tetraethylthiuram disulfide, dipentamethylenethiuram disulfide, and diisopropylxanthogen disulfide; and the like may be mentioned. These can be used alone or as two or more types combined. Among these, mercaptans are preferable, and t-dodecyl mercaptan is more preferable. The amount of use of the molecular weight adjuster is preferably 0.02 to 1.4 parts by weight, and more preferably 0.1 to 1.1 parts by weight with respect to 100 parts by weight of the monomers used for the emulsion polymerization.

In addition, as the molecular weight adjuster, from the viewpoint of being able to make the action and effect of the present invention more remarkable, among the mercaptans, the following two alkylthiol compounds may be used each alone or in combination: an alkylthiol compound having 12 to 16 carbon atoms, and having at least three tertiary or higher carbon atoms and a thiol group directly bonded to at least one tertiary carbon atom of the at least three tertiary or higher carbon atoms (hereinafter, appropriately referred to as "the first alkylthiol compound"); and an alkylthiol compound having 9 to 16 carbon atoms, other than "the first alkylthiol compound" (that is, an alkylthiol compound having 9 to 16 carbon atoms, and having less than three tertiary or higher carbon atoms, or an alkylthiol compound having 9 to 16 carbon atoms, and having three or more tertiary or higher carbon atoms, and no thiol group directly bonded to a tertiary carbon atom; hereinafter, appropriately referred to as "the second alkylthiol compound"). In addition, the amounts of use of these in the case of using these in combination are as follows: the amount of use of the first alkylthiol compound is set to be preferably 0.01 to 0.6 part by weight, and more preferably 0.02 to 0.4 part by weight, and amount of use of the second alkylthiol compound is set to be preferably 0.01 to 0.8 part by weight, and more preferably 0.1 to 0.7 part by weight, with respect to 100 parts of the monomers used in the emulsion polymerization.

For the medium of emulsion polymerization, usually water is used. The amount of the water is preferably 80 to 500 parts by weight, and more preferably 80 to 300 parts by weight, with respect to 100 parts by weight of the monomers used for the polymerization.

In the emulsion polymerization, it is possible to further use, if necessary, polymerization auxiliary materials such as a stabilizer, a dispersant, a pH adjuster, a deoxidizer, a viscosity adjuster, a pH buffer, and a particle size adjuster. When these are used, the types and the amounts used thereof are not particularly limited.

The polymerization conversion rate in the emulsion polymerization is set preferably within a range from 60 to 95%, and more preferably within a range from 75 to 93%, from the viewpoint of being able to improve the heat resistance and the friction properties of the friction material produced by using the latex of the present invention.

Further, in the present invention, for the obtained copolymer, if necessary, the hydrogenation (hydrogenation reaction) of the copolymer may be performed. The hydrogenation may be performed on the basis of a known method. An oil layer hydrogenation method in which the latex of the copolymer obtained by emulsion polymerization is coagulated, and then the hydrogenation is performed in the oil layer; and an aqueous layer hydrogenation method in which the latex of the copolymer which is obtained is hydrogenated as it is, and the like may be mentioned.

In the aqueous layer hydrogenation method, the hydrogenation reaction is suitably performed by adding water to and diluting, if necessary, the latex of the copolymer prepared by the emulsion polymerization. As the aqueous layer hydrogenation method, an aqueous layer direct hydrogenation method in which the latex is hydrogenated by supplying hydrogen to the reaction system in the presence of a hydrogenation catalyst, and an aqueous layer indirect hydrogenation method in which the latex is hydrogenated by reducing the latex in the presence of an oxidizing agent, a reducing agent and an activating agent may be mentioned. Of these two methods, the aqueous layer direct hydrogenation method is preferable.

In the aqueous layer direct hydrogenation method, the concentration of the copolymer in the aqueous layer (concentration in latex state) is preferably 50 wt % or less, in order to prevent the aggregation. As the hydrogenation catalyst, a platinum group element-containing compound is used in a state of being dissolved or dispersed.

A platinum group element-containing hydrogenation catalyst is not particularly limited, so long as the platinum group element-containing hydrogenation catalyst is a water-soluble or water-dispersible platinum group element compound; specifically, as such a compound, a ruthenium compound, a rhodium compound, a palladium compound, an osmium compound, an iridium compound, a platinum compound, and the like may be mentioned. In the production method of the present invention, such a hydrogenation catalyst is not carried on a carrier, but is used for the hydrogenation reaction in a state of being dissolved or dispersed in the latex of the above-mentioned conjugated diene-based polymer. As the hydrogenation catalyst, a palladium compound or a rhodium compound is preferable, and a palladium compound is particularly preferable. In addition, two or more platinum group element compounds may also be used, but even in such a case, it is preferable to use a palladium compound as a main catalyst component.

The palladium compound is not particularly limited so long as the palladium compound is water-soluble or water-dispersible, and exhibits a hydrogenation catalytic activity; the palladium compound is preferably a water-soluble palladium compound. Further, as the palladium compound, usually a II-valent or IV-valent palladium compound is used, and as the form of such a palladium compound, a salt or a complex salt may be mentioned.

As the palladium compound, for example, an organic acid salt such as palladium acetate, palladium formate, and palladium propionate; an inorganic acid salt such as palladium nitrate, and palladium sulfate; a halide such as palladium fluoride, palladium chloride, palladium bromide, and palladium iodide; an inorganic palladium compound such as palladium oxide, and palladium hydroxide; an organic palladium compound such as dichloro(cyclooctadiene)palladium, dichloro(norbornadiene)palladium, and dichlorobis(triphenylphosphine)palladium; a halogenated salt such as sodium tetrachloropalladate, and ammonium hexachloropalladate; a complex salt such as potassium tetracyanopalladate; and the like may be mentioned. Among these palladium compounds, an organic acid salt or inorganic acid salt such as palladium acetate, palladium nitrate, and palladium sulfate; palladium chloride; a halogenated salt such as sodium tetrachloropalladate, and ammonium hexachloropalladate are preferable; and palladium acetate, palladium nitrate and palladium chloride are more preferable.

In addition, as the rhodium compound, a halide such as rhodium chloride, rhodium bromide, and rhodium iodide; an inorganic acid salt such as rhodium nitrate, and rhodium sulfate; an organic acid salt such as rhodium acetate, rhodium formate, rhodium propionate, rhodium butyrate, rhodium valerate, rhodium naphthenate, and rhodium acetylacetonate; rhodium oxide; rhodium trihydroxide; and the like may be mentioned.

As the platinum group element compounds, commercially available products may be used, or alternatively, the products produced by the known methods can also be used. In addition, the method for dissolving or dispersing the platinum group element compound in the latex of a conjugated diene-based polymer is not particularly limited; as such a method, a method in which a platinum group element compound is directly added to the latex, a method in which a platinum group element compound in a state of being dissolved or dispersed in water is added to the latex, and the like may be mentioned. In the case where a platinum group element compound is dissolved or dispersed in water, by using, for example, an inorganic acid such as nitric acid, sulfuric acid, hydrochloric acid, bromic acid, perchloric acid, and phosphoric acid; a sodium salt and potassium salt of these inorganic acids; an organic acid such as acetic acid; and the like in combination, the platinum group element compound is sometimes increased in the solubility in water, so it is preferable.

The amount of use of the hydrogenation catalyst may be appropriately determined, but is preferably 5 to 6000 ppm by weight, and more preferably 10 to 4000 ppm by weight, with respect to the copolymer obtained by the polymerization.

In the aqueous layer direct hydrogenation method, after the completion of the hydrogenation reaction, the hydrogenation catalyst in the latex is removed. As the method for removing the hydrogenation catalyst, for example, it is possible to adopt a method in which an adsorbent such as activated carbon and an ion-exchange resin is added to the latex, the hydrogenation catalyst is adsorbed to the adsorbent under stirring, and then the latex is subjected to a filtration or centrifugation, or a method in which the platinum group element in the platinum group element compound present in the latex is complexed with a complexing agent to foam a insoluble complex, and then the latex is filtered or centrifuged. It is also possible not to remove the hydrogenation catalyst so as to remain in the latex. In addition, after the completion of the hydrogenation reaction, if necessary, the pH of the latex may also be adjusted by adding a pH adjuster and the like.

In the latex of the present invention, the total content of the potassium and sodium contained in the latex is 2,300 to 10,000 ppm by weight, preferably 2,300 to 9,800 ppm by weight, and more preferably 2,400 to 9,000 ppm by weight, with respect to the whole latex. By setting the total content of the potassium and sodium contained in the latex within the above-mentioned range, the chemical stability and the thermal stability of the latex itself are improved, and moreover, the heat resistance of the members and the like in various applications which are obtained using the this latex. Moreover, a friction material produced by mixing the this latex and a thermosetting resin is excellent in heat resistance and friction properties.

In addition, in the latex of the present invention, it is sufficient so long as the total content of the potassium and sodium is within the above-mentioned range; however, from the viewpoint of being able to more enhance the chemical stability and the thermal stability of the latex itself, and the heat resistance and the friction properties when made into a friction material, the content of potassium alone is preferably 1,500 to 8,500 ppm by weight, and more preferably 2,100 to 7,000 ppm by weight, with respect to the whole latex. The content of sodium alone is preferably 1,000 to 7,500 ppm by weight, and more preferably 1,600 to 6,000 ppm by weight, with respect to the whole latex. When the total content of the potassium and sodium contained in the latex is too small, the chemical stability of the latex decreases, and due to this, when the concentration of the metal atom in the latex changes rapidly such as the case where an additive is mixed in the latex, aggregates tend to be generated in the latex. The compatibility (miscibility) of the latex with a thermosetting resin also decreases, and accordingly the latex is unsuitable for being used as mixed with the thermosetting resin. On the other hand, when the total content of the potassium and sodium contained in the latex is too large, aggregates are generated in the latex due to the effect of potassium and sodium (potassium ions and sodium ions).

In the present invention, the method for setting the total content of the potassium and sodium contained in the latex within the above-mentioned range is not particularly limited; however, as such a method, a method in which as the compounds and the medium used for the production of the latex, the types and the amounts of use of the compounds and medium that contain potassium and sodium are regulated, and the like may be mentioned.

Specifically, a method in which the type and the amount of use of the emulsifier used during performing emulsion polymerization is regulated, a method in which the water used as the medium of the emulsion polymerization is selected from distilled water, ultrapure water, ion-exchanged water, and the like, a method in which the type and the amount of use of the adjuster for the polymerization initiator used in the copolymerization of the above-mentioned monomers are regulated, a method in which the type and the amount of use of the polymerization terminator used in the copolymerization of the above-mentioned monomers are regulated, a method in which the type and the amount of use of the emulsifier added for the post-stabilization for suppressing the aggregation (self-coagulation) between the latex particles are regulated, a method in which the type and the amount of use of the adjuster for the hydrogenation catalyst used during performing the hydrogenation of the copolymer (the pH adjuster and the like when the hydrogenation catalyst is used in a form of an aqueous solution) are regulated, a method in which the type and the addition amount of the additive such as a salt which is mixed accordance with need for the purpose of decreasing the viscosity of the latex or for the purpose of regulating the pH as the pH adjuster and the like are regulated, and the like may be mentioned. Alternatively, a method in which the compound to be a potassium source and a sodium source is appropriately added to the latex obtained by emulsion polymerization, a method in which the amounts of the monomers used in the polymerization are regulated because potassium and sodium are sometimes contained in small amounts in the monomers used in the polymerization, and the like may also be mentioned. These methods may be used as single types alone or as two or more types combined.

Note that the total content of the potassium and sodium contained in the latex of the present invention only has to be within the above-mentioned range with respect to the whole latex, but is preferably 4500 to 33000 ppm by weight, more preferably 4500 to 32000 ppm by weight, and still more preferably 4800 to 29000 ppm by weight, in tams of the amount with respect to the carboxyl group-containing nitrile rubber (that is, the solid ingredient) in the latex. By setting the total content of the potassium and sodium contained in the latex within the above-mentioned range, in terms of the weight with respect to the carboxyl group-containing nitrile rubber (that is, the solid ingredient) in the latex, it is possible to more enhance the chemical stability and the thermal stability of the latex itself, and the heat resistance and the friction properties when made into a friction material.

The pH of the latex of the present invention is preferably less than 12, more preferably within a range from 7.0 to 11.5, still more preferably within a range from 7.5 to 11.0, and particularly preferably within a range from 7.5 to 10.0. By setting the pH within the above-mentioned range, the chemical stability of the latex is improved.

The method for regulating the pH of the latex within the above-mentioned range is not particularly limited, but for example, it is possible to use a method in which the pH of the latex of the carboxyl group-containing nitrile rubber constituting the latex is preliminarily regulated by using a pH adjuster. In addition, a method in which the type and the amount of use of the emulsifier used during emulsion polymerization are regulated, a method in which the type and the amount of use of the adjuster such as the polymerization initiator and the polymerization terminator used in the copolymerization of the above-mentioned monomers are regulated, a method in which the type and the amount of use of the emulsifier added after emulsion polymerization for the post-stabilization for suppressing the aggregation (self-coagulation) between the latex particles are regulated, a method in which the type and the amount of use of the adjuster for the hydrogenation catalyst used during performing the hydrogenation of the copolymer (the pH adjuster and the like when the hydrogenation catalyst is used in a form of an aqueous solution) are regulated, a method in which the type and the addition amount of the additive such as a salt which is mixed accordance with need for the purpose of decreasing the viscosity of the latex or for the purpose of regulating the pH as the pH adjuster and the like are regulated, and like may be mentioned. These methods may be used as single types alone or as two or more types combined.

Latex Composition

The latex composition of the present invention contains the above-mentioned latex of the present invention, and a thermosetting resin.

The thermosetting resin is not particularly limited so long as the thermosetting resin is a resin to be cured by heating, and from the viewpoint of being excellent in the compatibility (miscibility) with the above-mentioned latex of the present invention, a water-soluble thermosetting resin is preferable; for example, a phenolic resin, a urea resin, a melamine resin, an epoxy resin, and the like may be mentioned. Among these, from the viewpoint of being able to make the action and effect of the present invention more remarkable, a phenolic resin or an epoxy resin is preferable, and a phenolic resin is particularly preferable.

The epoxy resin is not particularly limited so long as the epoxy resin is a resin having an epoxy group and exhibiting a water solubility; as the epoxy resin, a bisphenol A type epoxy resin, a bisphenol AD type epoxy resin, a bisphenol F type epoxy resin, a bisphenol AF type epoxy resin, a phenol novolac type epoxy resin, a cresol novolac type epoxy resin, an α-naphthol novolac type epoxy resin, a bisphenol A novolac type epoxy resin, and the like may be used without limitation; among these, a bisphenol A novolac type epoxy resin is preferable. Note that, the epoxy resin as referred to herein includes a so-called epoxy resin precursor before becoming a cured type epoxy resin by undergoing three-dimensional cross-linking.

A curing agent may be used in the epoxy resin. The curing agent for the epoxy resin is not particularly limited, but as the curing agent, amines, acid anhydrides, imidazoles, mercaptans, phenolic resins, and the like may be mentioned.

As the phenolic resin, it is possible to use any general-purpose phenolic resins prepared by condensing phenols and aldehydes in the presence of acidic catalysts or in the presence of basic catalysts.

As the phenols used in the preparation of the phenolic resins, carbolic acid, m-cresol, p-cresol, o-cresol, p-alkylphenol, and the like are suitably used, and mixtures of these can also be used. In addition, as the aldehydes used in the preparation of the phenolic resins, formaldehyde, acetaldehyde, and the like are suitably used, and the mixtures of these may also be used.

In addition, as the phenolic resin, both of a resol-type phenolic resin and a novolac-type phenolic resin can be used; moreover, various modified phenolic resins can also be used, and these may also be used as blended with each other. Moreover, as the phenolic resin used, the phenolic resins may be used by being selected according to the object, with respect to the properties such as the degree of the condensation of phenols with aldehydes, the molecular weight, and the residual percentage of the residual monomer; various phenolic resins being different from each other with respect to these physical properties and having various grades are commercially available, and accordingly such commercially available phenolic resins may be appropriately used.

Note that, the phenolic resin as referred to herein includes a so-called phenolic resin precursor before becoming a cured type phenolic resin by undergoing three-dimensional cross-linking. In addition, as the modified phenolic resin, the resol-type phenol resins modified with various thermoplastic polymers, or the novolac type phenol resins modified with various thermoplastic polymers may be mentioned. The thermoplastic polymer used in the modification for obtaining the modified phenolic resins is not particularly limited, but as such thermoplastic polymer, elastomers such as nitrile rubber, hydrogenated nitrile rubber, isoprene rubber, polybutadiene rubber, acrylic rubber, and ethylene acrylic rubber; polyamide resin, phenoxy resin, polyvinylbutyral resin, polyethylene terephthalate, polyurethane, methyl methacrylate-based copolymer, polyester resin, cellulose acetate polymer, polyvinyl alcohol, and the like may be mentioned.

The content of the thermosetting resin in the latex composition of the present invention is preferably 40 to 500 parts by weight, more preferably 50 to 450 parts by weight, and still more preferably 60 to 400 parts by weight, with respect to 100 parts by weight of the carboxyl group-containing nitrile rubber contained in the latex composition. By setting the content of the thermosetting resin within the above-mentioned range, when a friction material using the latex composition of the present invention is obtained, it is possible to more enhance the heat resistance and the friction properties of the friction material to be obtained.

In addition, the latex composition of the present invention may further contain dispersants such as methylcellulose, carboxymethylcellulose, polyvinylpyrrolidone, polyvinyl alcohol, polyvinylmethyl ether, and polyvinylethyl ether; flexibility-promoting agents such as glycols; surfactants; and the like.

In addition, the latex composition of the present invention can contain, if necessary, the following as added therein: isocyanate, blocked isocyanate, oxazoline-based compounds, carbodiimide-based compounds, maleimides, thermosetting polyimides such as bis-allyl-nadi-imide, ethylene urea, 2,6-bis(2,4-dihydroxyphenylmethyl)-4-chlorophenol, various phenols-formaldehydes condensates (for example, resorcin-formaldehyde condensate, monohydroxybenzene-formaldehyde condensate, chlorophenol-formaldehyde condensate, resorcin-monohydroxybenzene-formaldehyde condensate, resorcin-chlorophenol-formaldehyde condensate, and modified resorcin-formalin resin such as a mixture composed of a condensate of sulfur monochloride and resorcin and a resorcin formalin condensate), polyepoxide, modified polyvinyl chloride, carbon black, carbon nanotube, silane coupling agent, adhesive aid, alkylpyrridinium halides, bisulfates, charge adding agents such as distearyldimethyl ammonium methyl sulfate, release agents such as waxes, processing adis such as stearic acid, silica, silicate, clay, bentonite, vermiculite, nontronite, beidelite, volkonskoite, hectorite, saponite, laponite, sauconite, layered polysilicate (magadiite), kenyaite, ledikite, plaster, alumina, titanium dioxide, talc and the like, fillers such as particles of inorganic substances such as the mixtures of these, binders such as starch, stabilizers such as polyvinlylpyrrolidone, plasticizer, cross-linking agent, vulcanizing agent, vulcanization accelerator, co-cross-linking agent, zinc oxide, unsaturated carboxylic acid metal salt, triazine thiols, water absorbent, colorants such as inorganic pigment and organic pigment, chelating agent, dispersant, antioxidant, ultraviolet absorber, surfactant, compression recovery agent, antifoaming agent, bactericide, preservative, wetting agent, tack preventing agent, foaming agent, foam stabilizer, penetrant, water-repellent/oil repellent, antiblocking agent, formalin catcher, flame retardant, thickening agent, softener, antiaging agent, oil, ozone deterioration preventing agent, suspension aid, condensation retarder, fluid loss agent, water resistant additive, lubricant, and the like.

As the cross-linking agent, organic peroxide cross-linking agents, polyamine cross-linking agents, and the like may be mentioned.

The co-cross-linking agent is not particularly limited, but is preferably a low molecular weight or high molecular weight compound having a plurality of radically reactive unsaturated groups in the molecule. For example, polyfunctional vinyl compounds such as divinylbenzene and divinylnaphthalene; isocyanurates such as triallyl isocyanurate and trimethallyl isocyanurate; cyanurates such as triallylcyanurate; maleimides such as N,N'-m-phenylenedimaleimide and diphenylmethane-4,4'-bismaleimide; allyl esters of polyvalent acids such as diallyl phthalate, diallyl isophthalate, diallyl maleate, diallyl fumarate, diallyl sebacate, and triallyl phosphate; diethylene glycol bisallyl carbonate; allyl ethers such as ethylene glycol diallyl ether, triallyl ether of trimethylol propane, and partial allyl ether of pentaerythrit; allyl-modified resins such as allylated novolac resin and allylated resol resin; and 3 to 5-functional methacrylate compounds and acrylate compounds such as trimethylolpropane trimethacrylate and trimethylolpropane triacrylate; and the like may be mentioned. These may be used as single types or a plurality of types combined.

The latex composition of the present invention may be blended with various latexes. As the latex to be blended with, acrylonitrile butadiene rubber latex, styrene acrylonitrile butadiene copolymer latex, acrylonitrile butadiene vinylpyridine copolymer latex, styrene butadiene copolymer latex, styrene butadiene vinylpyridine copolymer latex, polybutadiene rubber latex, chloroprene rubber latex, chlorosulfonated polyethylene latex, natural rubber latex, polyisoprene rubber latex, emulsion of epichlorohydrin, emulsion of epichlorohydrin-polyether copolymer, emulsion of styrene-isoprene-styrene block copolymer, fluororubber latex, ethylene-propylene-diene copolymer latex (emulsion), acrylic acid ester copolymer latex, polyvinyl chloride emulsion, ethylene-vinyl acetate copolymer latex (emulsion), and the like may be mentioned.

As the method for allowing the latex composition of the present invention to contain a thermosetting resin, it is possible to use, for example, a method in which in the above-mentioned latex composition of the present invention, the thermosetting resin is mixed. In this case, the thermosetting resin may be mixed as it is, or alternatively, the thermosetting resin may be dissolved or dispersed in water, and may be mixed in a state of a solution or dispersion; it is preferable that the thermosetting resin is mixed in a state of a dispersion liquid which is obtained by dispersing the thermosetting resin in water in the presence of an emulsifier. Because in the latex composition of the present invention, as described above, the total content of the potassium and sodium contained in the latex constituting the latex composition is controlled so as to fall within the above-mentioned range, the latex composition of the present invention is excellent in chemical stability and thermal stability, and moreover, excellent in the compatibility (miscibility) with the thermosetting resin, and consequently the latex and the thermosetting resin constituting the latex composition are satisfactorily compatible or miscible with each other, and the heat resistance and the friction properties of the friction material to be obtained can be made excellent.

Friction Material

The friction material of the present invention is obtained by making the above-mentioned latex composition of the present invention attached to or mixed with the base material.

The base material is not particularly limited, and usually a fiber base material are used as the base material. As the fiber base material, inorganic fibers or organic fibers made of copper, stainless steel, brass, aramid, carbon, glass, potassium titanate, rock wool, ceramic and the like may be mentioned.

The method for producing the friction material of the present invention is not particularly limited, but the friction material of the present invention can be produced, for example, by immersing a base material in the above-mentioned latex composition of the present invention, by thus attaching the latex composition of the present invention to the surface of the base material, and by drying the thus treated base material, if necessary. In addition, in this case, after performing the drying, if necessary, heating may also be performed, in order to promote the curing of the thermosetting resin contained in the latex composition of the present invention. The heating temperature for the curing may be appropriately selected according to the type of the thermosetting resin used, but is usually 120 to 240° C., and the heating time is usually 30 minutes to 8 hours.

The friction material of the present invention is one obtained by using the above-mentioned latex composition of the present invention, and accordingly is excellent in heat resistance and friction properties. Consequently, by taking advantage of such properties, the friction material of the present invention is suitable for various friction materials such as brake lining, disc pad, clutch facing and the like for automobiles and industrial machines.

Note that, in the above-mentioned examples, an example in which the latex of the present invention is mixed with a thermosetting resin to produce a latex composition, and a friction material is produced by using the obtained latex composition is mentioned as an example; however, the latex of the present invention is excellent in chemical stability and thermal stability, and excellent in the heat resistance of various members and the like in the applications which are obtained using the latex of the present invention, and accordingly, the latex of the present invention can be suitably used not only in such friction materials but also in a wide variety of applications to materials other than friction materials.

For examples, the latex of the present invention is suitably used in the following wide range of applications: raw materials for nonwoven fabrics widely used as clothing such as clothing interlining, kimono interlining, and underwear, industrial materials such as filters, polishing cloth, and heat insulator, hygienic goods such as masks, gauze, white coats, automobile interior materials and filter for air conditioning; dip molding compositions for dip molding nipple, air ball, glove, balloon, sack and the like; latex adhesives for enhancing the adhesive force between the base material woven fabric and the rubber member in toothed belt (timing belts for automobiles and general industries, timing belts in oil, oil pump belts and the like), poly-ribbed belt, lapped belt, V belt and the like; adhesives used for various fibers for reinforcing rubber (tire cord, twisted cord such as core wire, reinforcing threads for rubber hose, short fiber, foundation cloth for diaphragm); fiber treatment agents (As fibers, polyamide fibers including aliphatic polyamides such as nylon and aromatic polyamide such as aramide, polyester fiber, carbon fiber, glass fiber, cotton fiber, basalt fiber, and the like may be mentioned. Fibers may be used as single types alone or in combinations); binders such as battery binder, fuel cell binder, paper coating binder, cement mixing agent, internal additive impregnating binder, and coating binder for ink-jet recording medium; papermaking; paper coating composition; resin modifying composition; foam rubbers (rubber foams) used for mattress, puff, roll, impact absorber, and the like; joint sheet, AL sheet (adsorption sheet using no paste), sheet material and sealing material such as gasket; coating material; and the like.

EXAMPLES

Hereinafter, the present invention is described by way of more detailed Examples, but the present invention is not limited these Examples. Note that hereinafter, "parts" are based on weight unless otherwise specified. In addition, tests and evaluations were performed as follows.

Iodine Value

The iodine value of the nitrile rubber was measured in accordance with JIS K 6235.

Contents of Respective Monomer Units Constituting Nitrile Rubber

The contents of the butadiene unit (1,3-butadiene unit and saturated butadiene unit) were calculated by measuring the iodine values (according to JIS K6235) of the nitrile rubber before the hydrogenation reaction and after the hydrogenation reaction.

The content of the acrylonitrile unit was calculated by measuring the nitrogen content in the nitrile group-containing copolymer rubber by the Kjeldahl method in accordance with JIS K6384 (units: ephr).

The content of the carboxyl group content was determined as follows: to 0.2 g of a 2-mm square piece of a nitrile rubber, 20 ml of ethanol and 10 ml of water were added. While stirring, a titration was performed at room temperature by using a 0.02N hydrous ethanol solution of potassium hydroxide, and thymolphthalein as an indicator, and thus the content of the carboxyl group was determined as the number of moles of the carboxyl group in 100 g of the carboxyl group-containing nitrile rubber (units: ephr). Moreover, the determined number of moles of the carboxyl group was converted into the content of the methacrylic acid unit in the nitrile rubber, and thus the content of the methacrylic acid unit in the nitrile rubber was calculated.

Amount of Potassium and Amount of Sodium in Latex

A latex of a carboxyl group-containing nitrile rubber was subjected to acid decomposition, then subjected to a quantitative analysis by using an ICP emission analyzer (trade name "Optima 4300DV," manufactured by Perkin-Elmer Corp.) on the basis of the ICP-AES method, and thus the amounts of potassium and sodium present in 1 kg of the latex of the carboxyl group-containing nitrile rubber were measured (units: ppm by weight).

Thermal Weight Loss at 450° C.

A latex of a carboxyl group-containing nitrile rubber was placed in a schale, air-dried for one night, then dried in hot air under the conditions of a temperature of 110° C. and a drying time of 30 minutes, and thus a sample of the solid content was obtained. The change in weight and the thermal change of the obtained sample in the temperature range from room temperature to 700° C. were measured, by using a theimogravimetric-differential thermal analyzer (trade name "EXSTAR-6000," manufactured by SII Nano Technology Inc.). Note that, the measurement conditions were as follows: the cell: Pt, the sample amount: approximately 20 mg, programmed temperature increase rate: 5° C./min, atmosphere: nitrogen flowing at 100 ml/min. The proportion of weight loss of the sample at the time of a temperature of 450° C. relative to the weight (dry weight) of the sample at the time of room temperature was determined as the weight loss on the basis of the following formula. It can be determined that the smaller the absolute value of the thermal weight loss, the more excellent the thermal stability.

Thermal weight loss at 450° C.(%)={((weight at the time of 450° C.)−(weight at the time of room temperature))/(weight at the time of room temperature)}×100

Chemical Stability

First, three NaCl aqueous solutions different from each other in the NaCl concentration were prepared. Among the prepared NaCl aqueous solutions, the solution having a NaCl concentration of 2.5 wt % was referred to as the No. 1 sample, the solution having a NaCl concentration of 3.0 wt % was referred to as the No. 2 sample, and the solution having a NaCl concentration of 4.0 wt % was referred to as the No. 3 sample. Next, 30 ml of each of the prepared NaCl aqueous solutions was measured, and placed in a 100-ml beaker respectively. Then, in each of the 100-ml beakers, a drop (approximately 0.2 cm$^3$) of a latex of a carboxyl group-containing nitrile rubber was added, and the number (s) (No. 1 to No. 3) of the NaCl aqueous solution(s) in which the latex was coagulated (did not completely diffuse in the NaCl aqueous solution) was recorded. It can be determined that the higher the concentration of the NaCl solution in which the coagulation of the latex does not occur, the more excellent the latex in chemical stability.

Elongation Change Rate

A film-shaped friction material-like test piece was punched with a modified No. 3 dumbbell to prepare an original state test piece. By using the original state test piece, the test piece was immersed in a mineral oil (Ultra G1, manufactured by Honda Motor Co., Ltd.) regulated at 150° C. for 72 hours on the basis of JIS K6258, and thus a test piece after immersion in a high-temperature oil was obtained. For each of the obtained original state test piece and the obtained test piece after immersion in a high-temperature oil, the elongation when the test piece was pulled at a tensile rate of 200 mm/min was measured on the basis of JIS K6251. The elongation change rate of the test piece after the immersion in a high-temperature oil relative to the elongation of the original state test piece was calculated on the basis of the following formula. It can be determined that the smaller the absolute value of the elongation change rate, the more excellent in heat resistance.

Elongation change rate (after immersion in high-temperature oil)(%)={((elongation of test piece after immersion in high-temperature oil)−(elongation of original state test piece))/(elongation of original state test piece)}×100

Change in Coefficient of Friction

For a film-shaped friction material-like test piece, the friction resistance of the surface was measured by using a Heidon type surface property measuring apparatus (trade name "HEIDON-38," manufactured by Shinto Scientific Co., Ltd.). Note that, in the measurement, a ball indenter (SUS ϕ10) was used as a measurement jig; when the test piece was moved horizontally under the conditions of a test load of 500 g (vertical load N), a test temperature of 200° C., a test speed of 600 mm/min, a travel distance of 15.0 mm, and a reciprocation times of 100, the friction force F (units: gf) applied to the dynamic distortion amplifier of the Heidon type surface property measuring apparatus was measured; the coefficient of friction μ was calculated by using the forth path value of the friction force on the basis of the following formula:

$$\mu=F/N$$

In the present measurement, the value of the coefficient of friction μ was continuously recorded between the state in which the test piece was at rest and the state in which the test piece was moving at a constant speed as a test speed, and the value when the coefficient of friction μ was in a constant state was taken as the dynamic coefficient of friction μk. Next, the test piece was allowed to stand still in Geer oven at 150° C. for 72 hours, and thus a test piece after thermal aging was obtained. For the test piece after the thermal aging, in the same manner as described above, the dynamic coefficient of friction μk was also measured, and the value obtained by subtracting the value of the dynamic coefficient of friction μk of the original state test piece before subjecting to the thermal aging from the dynamic coefficient of friction after the thermal aging was determined as a change in coefficient of friction (after heat again). Note that, it can be determined that the smaller the change in coefficient of friction, the more excellent in the friction properties in a high temperature environment.

Example 1

Production of Carboxyl Group-Containing Nitrile Rubber Latex (A-1)

In a reactor, 180 parts of ion exchanged water, 25 parts of an aqueous solution of sodium dodecylbenzenesulfonate having a concentration of 10 wt %, 20 parts of acrylonitrile, 6 parts of methacrylic acid, and 0.5 part of t-dodecyl mercaptan (molecular weight adjuster) were charged in the mentioned order, the gas inside the reactor was replaced with nitrogen three times, and then 72 parts of 1,3-butadiene was charged in the reactor. The reactor was held at 5° C., 0.1 part of cumene hydroperoxide (polymerization initiator), suitable amounts of a reducing agent and a chelating agent were charged in the reactor, and the polymerization reaction was continued for approximately 16 hours while the reaction mixture was being stirred. Next, 0.1 part of an aqueous solution of hydroquinone (polymerization terminator) having a concentration of 10 wt % was added to terminate the polymerization reaction at a polymerization conversion rate of 85%, then the residual monomers were removed by using a rotary evaporator at a water temperature of 60° C., an appropriate amount of an alkaline soap was added to the reaction mixture, and then the reaction mixture was concentrated to obtain a latex of a nitrile rubber.

Then, in an autoclave, the latex and a salt composed of a palladium catalyst (a palladium catalyst acidic aqueous solution prepared by adding nitric acid of 5-fold molar equivalent of palladium) and a pH buffer (containing potassium and sodium) were added in such a way that the content of palladium was 2000 ppm by weight with respect to the dry weight of the rubber contained in the latex, moreover polyvinylpyrrolidone having a weight average molecular weight of 5,000 was added in an amount five times the amount of palladium, and nitrogen gas was flown for 10 minutes to remove the dissolved oxygen in the latex. Next, a hydrogenation reaction was performed at a hydrogen pressure of 3 MPa and at a temperature of 50° C. for 6 hours to obtain a carboxyl group-containing nitrile rubber latex (A-1) having a solid content concentration of approximately 36 wt %. For the obtained carboxyl group-containing nitrile rubber latex (A-1), according to the above-mentioned methods, the contents of the respective monomer units, the amount of potassium and the amount of sodium in the latex, the thermal weight loss at 450° C., and the chemical stability were evaluated. The results thus obtained are shown in Tale 1.

Note that, in the obtained carboxyl group-containing nitrile rubber latex (A-1), the content of potassium was 4500 ppm by weight, and the content of sodium was 1900 ppm by weight, with respect to the whole latex. In addition, the carboxyl group-containing nitrile rubber had an iodine value of 40, and a carboxyl group content of $5 \times 10^{-2}$ ephr. The solid content taken out by air drying the carboxyl group-containing nitrile rubber latex (A-1) was able to be dissolved in tetrahydrofuran, and no insoluble content was found.

Production of Phenolic Resin-Containing Latex Composition and Friction Material-Like Test Piece In a heat-resistant vat, 100 parts (in terms of the solid content) of the carboxyl group-containing nitrile rubber latex (A-1) obtained as described above was placed, 100 parts (in terms of the solid content) of a phenolic resin (trade name "Sumilight Resin PR-14170," manufactured by Sumitomo Bakelite Co., Ltd.) was mixed with the latex (A-1), and thus a phenolic resin-containing latex composition was obtained. The obtained phenolic resin-containing latex composition was air-dried for one night, and then dried with an air-blowing drier under the conditions of 110° C. and 10 minutes. Subsequently, the solid product obtained by drying was pressed by using a 5-mm thick mold frame and cured at 160° C. for 30 minutes, and thus a film-shaped friction material-like test piece was obtained. Then, by using the obtained friction material-like test piece, according to the above-mentioned methods, the elongation change rate and the change in coefficient of friction were measured. The results thus obtained are shown in Table 1.

Example 2

Production of Carboxyl Group-Containing Nitrile Rubber Latex (A-2)

A carboxyl group-containing nitrile rubber latex (A-2), having a solid content concentration of approximately 43 wt % was obtained in the same manner as in Example 1 except that the amount of acrylonitrile at the time of polymerization was altered from 20 parts to 31 parts, and the amount of use of the salt composed of the palladium catalyst and the pH buffer was altered from 2000 ppm by weight to 2500 ppm by weight in tams of the palladium amount; and the evaluations were performed in the same manner as in Example 1. The results thus obtained are shown in Table 1.

Note that, in the obtained carboxyl group-containing nitrile rubber latex (A-2), the content of potassium was 5000 ppm by weight, and the content of sodium was 1690 ppm by weight, with respect to the whole latex. In addition, the carboxyl group-containing nitrile rubber had an iodine value of 20, and a carboxyl group content of $5 \times 10^{-2}$ ephr. The solid content taken out by air drying the carboxyl group-containing nitrile rubber latex (A-2) was able to be dissolved in tetrahydrofuran, and no insoluble content was found.

Production of Phenolic Resin-Containing Latex Composition and Friction Material-Like Test Piece A phenolic resin-containing latex composition and a friction material-like test piece were obtained in the same manner as in Example 1 except that the carboxyl group-containing nitrile rubber latex (A-2) obtained as described above was used in place of the carboxyl group-containing nitrile rubber latex (A-1); and the evaluations were performed in the same manner as in Example 1. The results thus obtained are shown in Table 1.

Example 3

Production of Carboxyl Group-Containing Nitrile Rubber Latex (A-3)

A carboxyl group-containing nitrile rubber latex (A-3) having a solid content concentration of approximately 44 wt % was obtained in the same manner as in Example 1 except that the amount of acrylonitrile was altered from 20 parts to 30 parts, and the amount of methacrylic acid was altered from 6 parts to 9 parts, respectively, at the time of polymerization; 10 parts of acrylonitrile was further added at the time of the polymerization conversion rate of 60%; and the amount of use of the salt composed of the palladium catalyst and the pH buffer, in the hydrogenation reaction, was altered from 2000 ppm by weight to 1500 ppm by weight in tams of palladium; and the evaluations were performed in the same manner as in Example 1. The results thus obtained are shown in Table 1.

Note that, in the obtained carboxyl group-containing nitrile rubber latex (A-3), the content of potassium was 4020 ppm by weight, and the content of sodium was 2060 ppm by weight, with respect to the whole latex. In addition, the carboxyl group-containing nitrile rubber had an iodine value of 50, and a carboxyl group content of $8 \times 10^{-2}$ ephr. The solid content taken out by air drying the carboxyl group-containing nitrile rubber latex (A-3) was able to be dissolved in tetrahydrofuran, and no insoluble content was found.

Production of Phenolic Resin-Containing Latex Composition and Friction Material-Like Test Piece A phenolic resin-containing latex composition and a friction material-like test piece were obtained in the same manner as in Example 1 except that the carboxyl group-containing nitrile rubber latex (A-3) obtained as described above was used in place of the carboxyl group-containing nitrile rubber latex (A-1); and the evaluations were performed in the same manner as in Example 1. The results thus obtained are shown in Table 1.

Example 4

Production of Carboxyl Group-Containing Nitrile Rubber Latex (A-4)

A carboxyl group-containing nitrile rubber latex (A-4) having a solid content concentration of approximately 36 wt % was obtained in the same manner as in Example 1 except that the amount of acrylonitrile was altered from 20 parts to 33 parts at the time of polymerization; and the evaluations were performed in the same manner as in Example 1. The results thus obtained are shown in Table 1.

Note that, in the obtained carboxyl group-containing nitrile rubber latex (A-4), the content of potassium was 4700 ppm by weight, and the content of sodium was 1850 ppm by weight, with respect to the whole latex. In addition, the carboxyl group-containing nitrile rubber had an iodine value of 32, and a carboxyl group content of $4 \times 10^{-2}$ ephr. The solid content taken out by air drying the carboxyl group-containing nitrile rubber latex (A-4) was able to be dissolved in tetrahydrofuran, and no insoluble content was found.

Production of Phenolic Resin-Containing Latex Composition and Friction Material-Like Test Piece A phenolic resin-containing latex composition and a friction material-like test piece were obtained in the same manner as in Example 1 except that the carboxyl group-containing nitrile rubber latex (A-4) obtained as described above was used in place of the carboxyl group-containing nitrile rubber latex (A-1); and the evaluations were performed in the same manner as in Example 1. The results thus obtained are shown in Table 1.

Comparative Example 1

Production of Carboxyl Group-Containing Nitrile Rubber Latex (A-5)

A latex of a carboxyl group-containing nitrile rubber was obtained in the same manner as in Example 1 except that the amount of acrylonitrile was altered from 20 parts to 29 parts and the amount of methacrylic acid was altered from 6 parts to 9 parts, respectively, at the time of polymerization; and the hydrogenation reaction was not performed. Note that, in Comparative Example 1, the hydrogenation reaction was not performed, but a carboxyl group-containing nitrile rubber latex (A-5) having a solid content concentration of approximately 37 wt % was obtained by adding a pH buffer to the latex of the nitrile rubber in the same manner as in Example 1. Next, for the obtained carboxyl group-containing nitrile rubber latex (A-5), the evaluations were performed in the same manner as in Example 1. The results thus obtained are shown in Table 1.

Note that, in the obtained carboxyl group-containing nitrile rubber latex (A-5), the content of potassium was 9050 ppm by weight, and the content of sodium was 1500 ppm by weight, with respect to the whole carboxyl group-containing nitrile rubber latex. In addition, the carboxyl group-containing nitrile rubber had an iodine value of 280, and a carboxyl group content of $8 \times 10^{-2}$ ephr. The solid content taken out by air drying the carboxyl group-containing nitrile rubber latex (A-5) was able to be dissolved in tetrahydrofuran, and no insoluble content was found.

Production of Phenolic Resin-Containing Latex Composition and Friction Material-Like Test Piece A phenolic resin-containing latex composition and a friction material-like test piece were obtained in the same manner as in Example 1 except that the carboxyl group-containing nitrile rubber latex (A-5) obtained as described above was used in place of the carboxyl group-containing nitrile rubber latex (A-1); and the evaluations were performed in the same manner as in Example 1. The results thus obtained are shown in Table 1.

Comparative Example 2

Production of Carboxyl Group-Containing Nitrile Rubber Latex (A-6)

A carboxyl group-containing nitrile rubber latex (A-6) having a solid content concentration of approximately 40 wt % was obtained in the same manner as in Example 1 except that the amount of acrylonitrile was altered from 20 parts to 40 parts at the time of polymerization, the hydrogenation reaction was not performed, and the pH buffer was not added; and the evaluations were performed in the same manner as in Example 1. The results thus obtained are shown in Table 1.

Note that, in the obtained carboxyl group-containing nitrile rubber latex (A-6), the content of potassium was 2000 ppm by weight, and the content of sodium was 1900 ppm by weight, with respect to the whole latex. In addition, the carboxyl group-containing nitrile rubber had an iodine value of 289, and a carboxyl group content of $5 \times 10^{-2}$ ephr. The solid content taken out by air drying the carboxyl group-containing nitrile rubber latex (A-6) was able to be dissolved in tetrahydrofuran, and no insoluble content was found.

Production of Phenolic Resin-Containing Latex Composition and Friction Material-Like Test Piece A phenolic resin-containing latex composition and a friction material-like test piece were obtained in the same manner as in Example 1 except that the carboxyl group-containing nitrile rubber latex (A-6) obtained as described above was used in place of the carboxyl group-containing nitrile rubber latex (A-1); and the evaluations were performed in the same manner as in Example 1. The results thus obtained are shown in Table 1.

Comparative Example 3

Production of Carboxyl Group-Containing Nitrile Rubber Latex (A-7)

A carboxyl group-containing nitrile rubber latex (A-7) having a solid content concentration of approximately 38 wt % was obtained in the same manner as in Example 1 except that the amount of acrylonitrile was altered from 20 parts to 30 parts, and the amount of methacrylic acid was altered from 6 parts to 4 parts, respectively, at the time of polymerization; a palladium catalyst was used without taking a foam of a salt with a pH buffer (that is, the pH buffer itself was not used); and the evaluations were performed in the same manner as in Example 1. The results thus obtained are shown in Table 1.

Note that, in the obtained carboxyl group-containing nitrile rubber latex (A-7), the content of potassium was 1000 ppm by weight, and the content of sodium was 1020 ppm by weight, with respect to the whole latex. In addition, the carboxyl group-containing nitrile rubber had an iodine value of 39, and a carboxyl group content of $3 \times 10^{-2}$ ephr. The solid content taken out by air drying the carboxyl group-containing nitrile rubber latex (A-7) was able to be dissolved in tetrahydrofuran, and no insoluble content was found.

Production of Phenolic Resin-Containing Latex Composition and Friction Material-Like Test Piece A phenolic resin-containing latex composition and a friction material-like test piece were obtained in the same manner as in Example 1 except that the carboxyl group-containing nitrile rubber latex (A-7) obtained as described above was used in place of the carboxyl group-containing nitrile rubber latex (A-1); and the evaluations were performed in the same manner as in Example 1. The results thus obtained are shown in Table 1.

Comparative Example 4

Production of Carboxyl Group-Containing Nitrile Rubber Latex (A-8)

A carboxyl group-containing nitrile rubber latex (A-8) having a solid content concentration of approximately 42 wt % was obtained in the same manner as in Example 1 except that the amount of acrylonitrile was altered from 20 parts to 18 parts at the time of polymerization, the amount of the use of the palladium catalyst at the time of performing the hydrogenation reaction was altered from 2000 ppm by weight to 2200 ppm by weight in terms of the palladium amount, and the type of the soap added after the removal of the residual monomers was altered; and the evaluations were performed in the same manner as in Example 1. The results thus obtained are shown in Table 1.

Note that, in the obtained carboxyl group-containing nitrile rubber latex (A-8), the content of potassium was 2500 ppm by weight, and the content of sodium was 8000 ppm by weight, with respect to the whole latex. In addition, the carboxyl group-containing nitrile rubber had an iodine value of 28, and a carboxyl group content of $4 \times 10^{-2}$ ephr. The solid content taken out by air drying the carboxyl group-containing nitrile rubber latex (A-8) was able to be dissolved in tetrahydrofuran, and no insoluble content was found.

Production of Phenolic Resin-Containing Latex Composition and Friction Material-Like Test Piece A phenolic resin-containing latex composition and a friction material-like test piece were obtained in the same manner as in Example 1 except that the carboxyl group-containing nitrile rubber latex (A-8) obtained as described above was used in place of the carboxyl group-containing nitrile rubber latex (A-1); and the evaluations were performed in the same manner as in Example 1. The results thus obtained are shown in Table 1.

temperature oil) and hence excellent in heat resistance, and is low in the change in coefficient of friction (after thermal aging), and hence is excellent in the friction properties in high temperature environments.

On the other hand, when the iodine value of the nitrile rubber was too high, the obtained latex was large in the absolute value of the thermal weight loss at 450° C., and was poor in thermal stability, and moreover, the solid content floated already before being added in a NaCl aqueous solution or coagulation occurred by only being dropwise added in a NaCl aqueous solution (No. 1) having a relatively low concentration, and thus poor in the chemical stability (Comparative Examples 1 and 2). Among these, the latex of Comparative Example 1 was too large in the total content of

TABLE 1

| | | | Examples | | | | Comparative Examples | | | |
|---|---|---|---|---|---|---|---|---|---|---|
| | | | 1 | 2 | 3 | 4 | 1 | 2 | 3 | 4 |
| Type of carboxyl group-containing nitrile rubber latex | | | (A-1) | (A-2) | (A-3) | (A-4) | (A-5) | (A-6) | (A-7) | (A-8) |
| Properties of carboxyl group-containing nitrile rubber latex | | | | | | | | | | |
| Rubber composition | Acrylonitrile unit | (wt %) | 21 | 32 | 40 | 34 | 30 | 41 | 31 | 19 |
| | Butadiene unit (inclusive of saturated part) | (wt %) | 74 | 63 | 53 | 62 | 63 | 54 | 66 | 77 |
| | Methacrylic acid unit | (wt %) | 5 | 5 | 7 | 4 | 7 | 5 | 3 | 4 |
| | Iodine value | | 40 | 20 | 50 | 32 | 280 | 289 | 39 | 28 |
| | Potassium | (ppm by weight) | 4500 | 5000 | 4020 | 4700 | 9050 | 2000 | 1000 | 2500 |
| | Sodium | (ppm by weight) | 1900 | 1690 | 2060 | 1850 | 1500 | 1900 | 1020 | 8000 |
| Composition of phenolic resin-containing latex composition | | | | | | | | | | |
| Carboxyl group-containing nitrile rubber latex*) | | (parts by weight) | 100 | 100 | 100 | 100 | 100 | 100 | 100 | 100 |
| Phenolic resin*) | | (parts by weight) | 100 | 100 | 100 | 100 | 100 | 100 | 100 | 100 |
| Evaluations | | | | | | | | | | |
| Carboxyl group-containing nitrile rubber latex | | | | | | | | | | |
| Thermal weight loss at 450° C. | | (%) | −38 | −30 | −34 | −36 | −61 | −59 | −37 | −37 |
| Chemical stability | | | Coagulation in No. 3 | Coagulation in No. 3 | Coagulation in No. 3 | Coagulation in No. 3 | Floating solid content | Coagulation in No. 2 | Coagulation in No. 1 | Floating solid content |
| Cured product of phenolic resin-containing latex | | | | | | | | | | |
| Elongation change rate (after immersion in high temperature oil) | | (%) | −5 | −2 | −1 | −1 | −69 | −63 | −15 | −20 |
| Change in coefficient of friction (after thermal aging) | | ($\Delta\mu\kappa$) | 0.077 | 0.069 | 0.079 | 0.074 | 0.23 | 0.2 | 0.12 | 0.13 |

*)Amount in terms of carboxyl group-containing nitrile rubber (amount in terms of solid content)

As shown in Table 1, in the case where a latex containing carboxyl group-containing nitrile rubber contains α,β-ethylenically unsaturated nitrile monomer unit in a content of 8 to 60 wt %, and has an iodine value of 120 or less, and the total content of the potassium and sodium contained in the latex was 2,300 to 10,000 ppm by weight, with respect to the whole latex, the obtained latex had a small absolute value of the thermal weight loss at 450° C., was excellent in thermal stability, and was excellent in chemical stability because the latex was dropwise added to an aqueous solution of NaCl, no coagulation was caused even in a NaCl aqueous solution (No. 3) having a relatively higher concentration (Examples 1 to 4). Moreover, in each of Examples 1 to 4, it has been verified that the friction material prepared by mixing the latex with a thermosetting resin is small in the absolute value of the elongation change rate (after immersion in a highthe potassium and sodium contained in the latex, the solid content floated already before being added in a NaCl aqueous solution, and was particularly poor in chemical stability. Moreover, in Comparative Examples 1 and 2, the obtained friction materials are large in the absolute value of the elongation change rate (after immersion in a high temperature oil), and hence is poor in heat resistance, and are large in the change in coefficient of friction (after thermal aging), and hence is poor in the friction properties in high temperature environment.

In addition, even when the iodine value of the nitrile rubber was within the above-mentioned range, in the case where the total content of the potassium and sodium contained in the latex was too small, the obtained latex underwent the occurrence of coagulation even when dropwise added in a NaCl aqueous solution (No. 1) having a relatively lower concentration, and hence was poor in the chemical stability (Comparative Example 3). In addition, in Comparative Example 3, the obtained friction material was poor in heat resistance and friction properties.

Moreover, when the iodine value of the nitrile rubber was within the above-mentioned range, but the total content of the potassium and sodium contained in the latex was too large, the obtained latex had floating solid content already before being added to an aqueous solution of NaCl, and hence was particularly poor in chemical stability (Comparative Example 4). In addition, in Comparative Example 4, the obtained friction material was poor in heat resistance and friction properties.

The invention claimed is:

1. A latex of a carboxyl group-containing nitrile rubber containing an α,β-ethylenically unsaturated nitrile monomer unit in a content of 8 to 60 wt %, and having an iodine value of 120 or less,
   wherein the total content of potassium and sodium contained in the latex is 2,300 to 10,000 ppm by weight with respect to the whole latex, and
   wherein the total content of potassium and sodium is 4,500 to 33,000 ppm by weight with respect to the carboxyl group-containing nitrile rubber.

2. The latex according to claim 1, wherein the pH is less than 12.

3. A latex composition comprising the latex according to claim 1 and a thermosetting resin.

4. The latex composition according to claim 3, wherein the thermosetting resin is a phenolic resin.

5. A friction material prepared by making the latex composition according to claim 4 attached to or mixed with a base material.

6. A friction material prepared by making the latex composition according to claim 3 attached to or mixed with a base material.

* * * * *